US008757893B1

(12) United States Patent
Isenhour et al.

(10) Patent No.: US 8,757,893 B1
(45) Date of Patent: Jun. 24, 2014

(54) OPTICAL CONNECTOR ASSEMBLIES HAVING ALIGNMENT COMPONENTS

(71) Applicant: Corning Cable Systems LLC, Hickory, NC (US)

(72) Inventors: Micah Colen Isenhour, Lincolnton, NC (US); Michael de Jong, Colleyville, TX (US); Dennis Michael Knecht, Hickory, NC (US); James Phillip Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 2 days.

(21) Appl. No.: 13/753,028

(22) Filed: Jan. 29, 2013

(51) Int. Cl.
 *G02B 6/36* (2006.01)
(52) U.S. Cl.
 USPC .................................. 385/76; 385/78; 385/86
(58) Field of Classification Search
 USPC ......................................... 385/76–79, 86–87
 See application file for complete search history.

(56) References Cited

U.S. PATENT DOCUMENTS

| 2003/0044125 A1* | 3/2003 | Kiani et al. ..................... 385/78 |
| 2011/0229083 A1* | 9/2011 | Dainese et al. ................. 385/74 |
| 2012/0099822 A1 | 4/2012 | Kuffel et al. .................... 385/78 |

* cited by examiner

*Primary Examiner* — Ellen Kim

(57) ABSTRACT

Cable assemblies and optical connector subassemblies having retractable alignment pins and coded magnetic arrays for optical alignment are disclosed. In one embodiment, an optical connector subassembly includes a connector body, an optical coupling assembly within the connector body, first and second alignment pins, and a pin switch coupled to the first and second alignment pins. The connector body includes a front surface, a first pin bore and a second pin bore. The optical coupling assembly includes at least one magnetic component, and an optical coupling face. The optical coupling assembly receives at least one optical fiber. The first alignment pin is disposed within the first pin bore and the second alignment pin is disposed within the second pin bore. Actuation of the pin switch translates the first and second alignment pins between a protracted state and a retracted state.

20 Claims, 13 Drawing Sheets

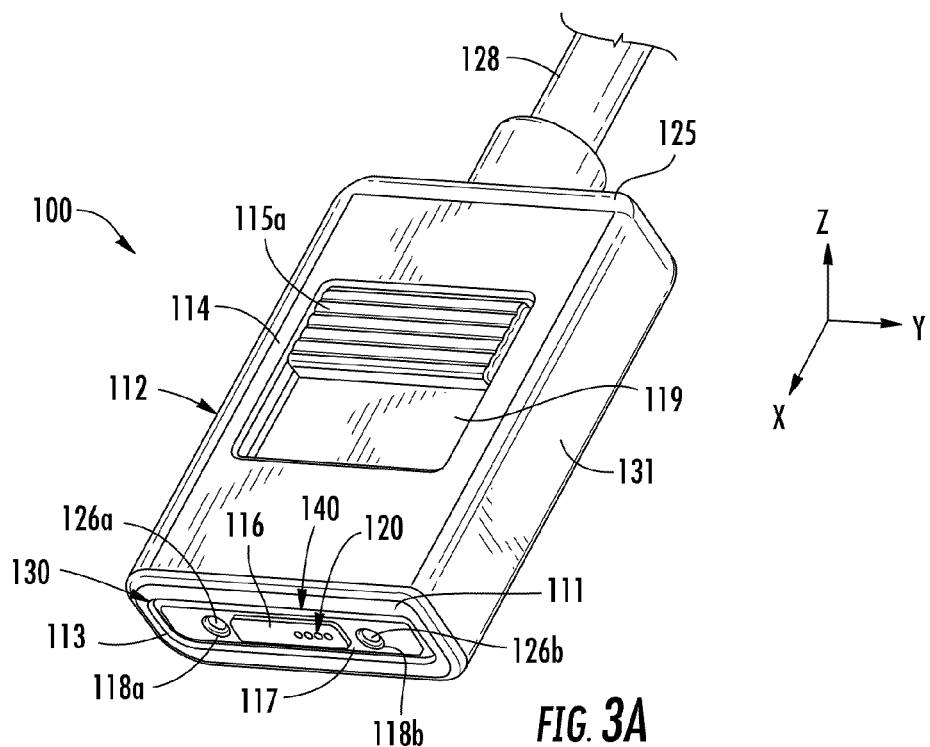
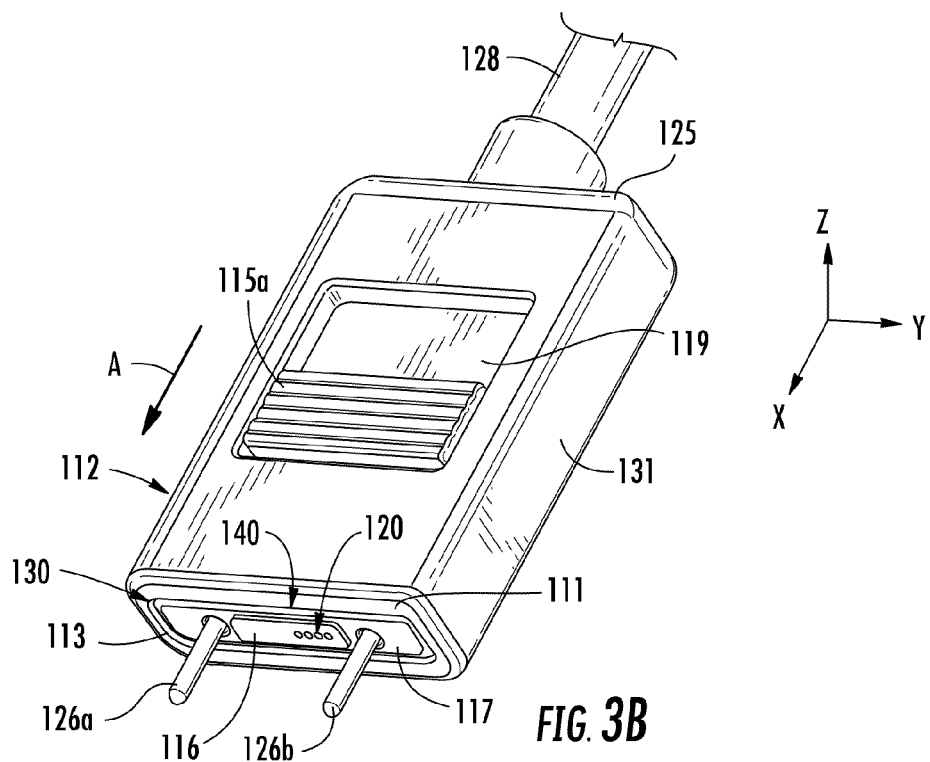

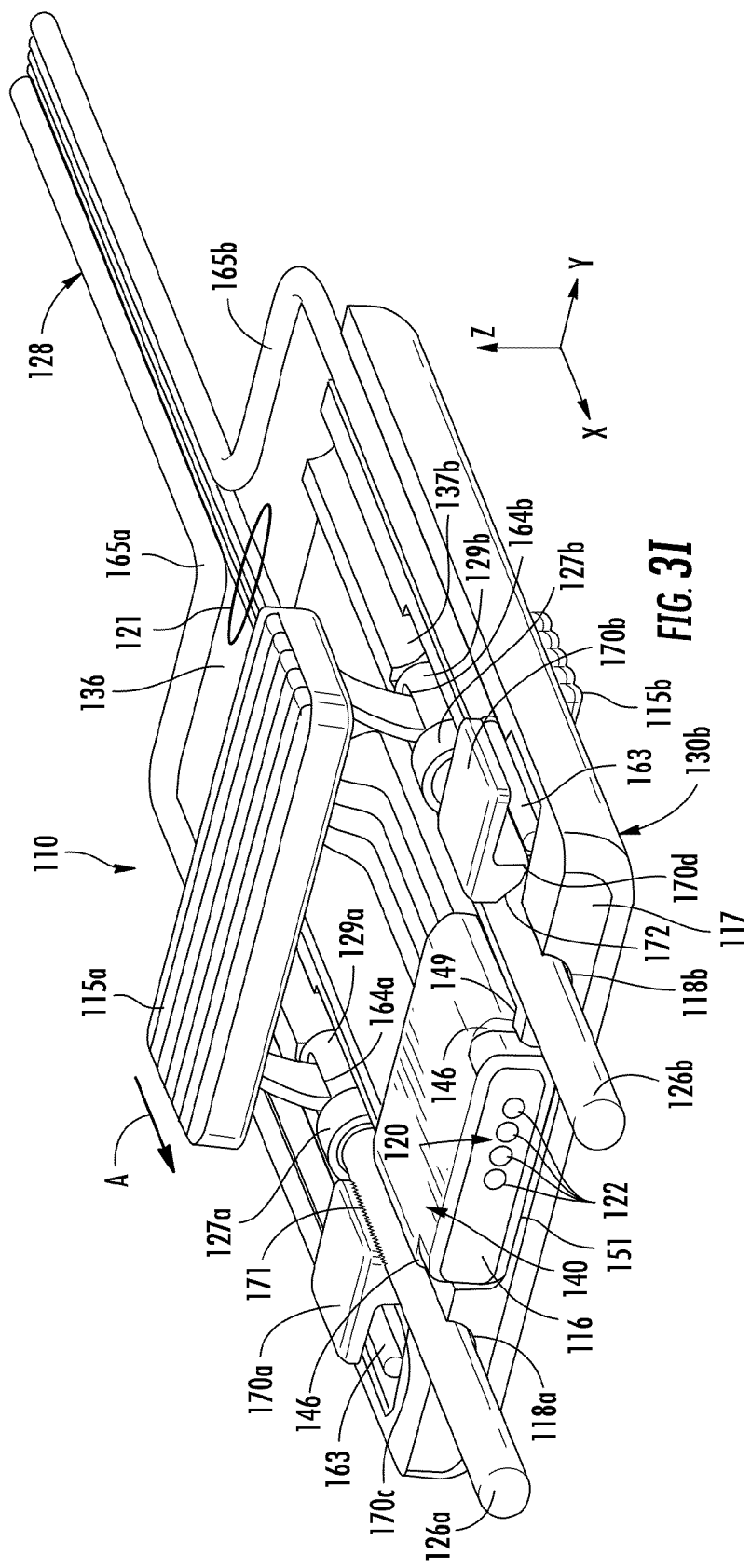

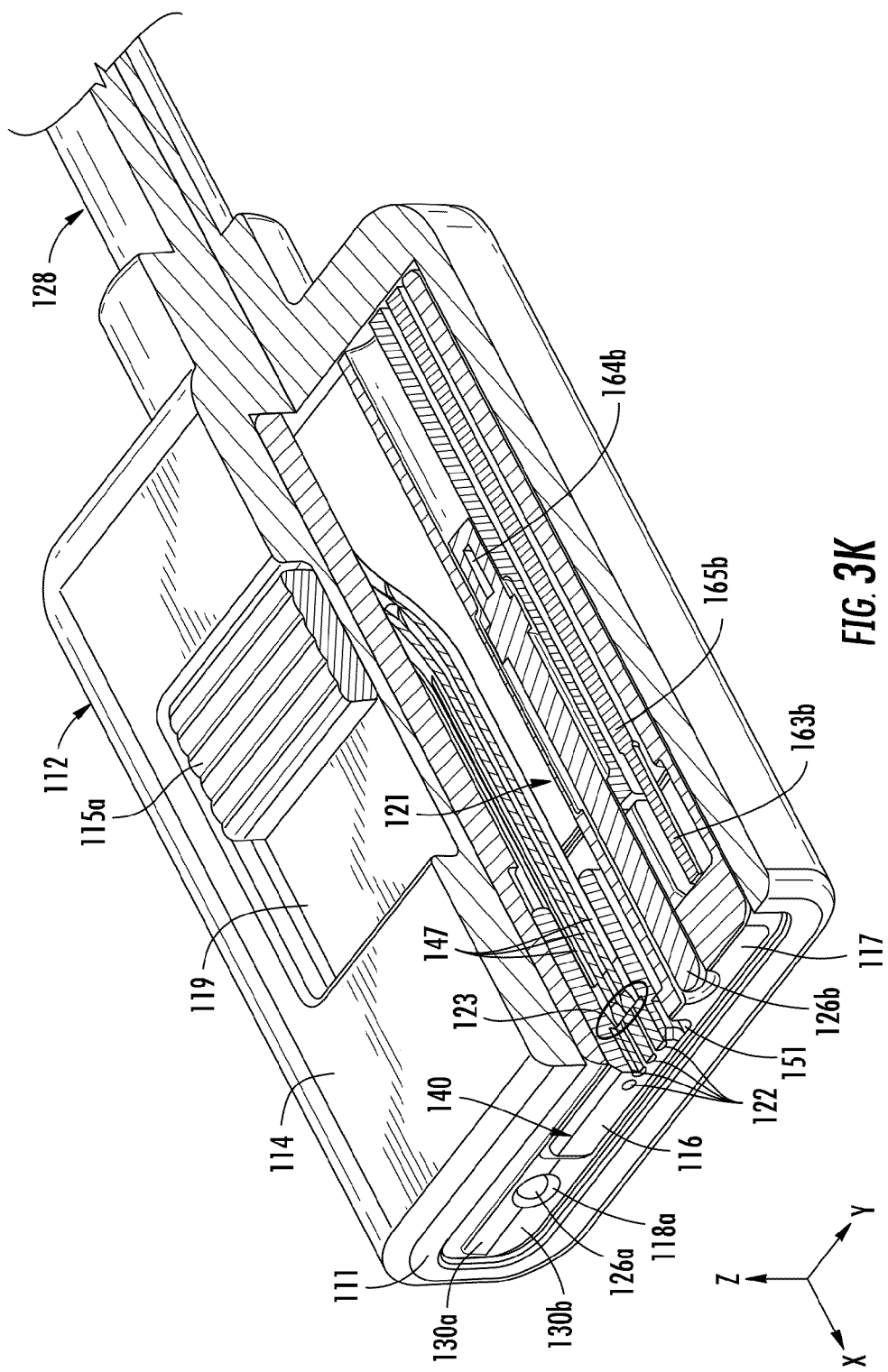

OPTICAL CONNECTOR ASSEMBLIES HAVING ALIGNMENT COMPONENTS

BACKGROUND

1. Field of the Disclosure

The technology of the disclosure relates to optical cable assemblies and optical connector subassemblies for optical communication and, more particularly, to optical cable assemblies and optical connector subassemblies having retractable alignment pins and coded magnetic arrays for alignment of mated optical connectors.

2. Technical Background

Benefits of optical fiber include extremely wide bandwidth and low noise operation. Because of these advantages, optical fiber is increasingly being used for a variety of applications, including, but not limited to, broadband voice, video, and data transmission. Additionally, optical cable assemblies may be utilized in consumer electronics applications to transfer data between electronic devices. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support optical fiber interconnections.

As the use of fiber optics migrates into numerous consumer electronics applications, such as connecting computer peripherals by the use of fiber optic cable assemblies, there will be a consumer-driven expectation for cables having improved performance, compatibility with future communication protocols, and a broad range of use. Current opto-mechanical interfaces utilized to optically couple an optical cable assembly to active optical components of an electronics device require precise mechanical structures to properly align the optical fibers of the optical cable assembly with the laser(s) and/or photodiode(s) of the electronics device. As such alignments require tight tolerances, the mechanical structures become costly, and may not be rugged enough for consumer electronics applications. Further, the mechanical structures often cause the optical interface of the optical cable assembly and the electronics device to be susceptible to the build-up of foreign substances (e.g., dust, liquid, food particles, etc.) that may interfere with the propagation of optical signals between the optical cable assembly and the electronics device.

SUMMARY OF THE DETAILED DESCRIPTION

Cable assemblies and optical connectors are provided to facilitate data transfer using optical signals. For example, optical fibers can be optically connected to another optical device, such as a light-emitting diode (LED), laser diode, or opto-electronic device, for light transfer. As another example, optical fibers can be optically connected to other optical fibers through mated optical connectors. In any of these cases, it is important that the end face of an optically connected optical fiber be precisely aligned with the optical device or other optical fiber to avoid or reduce coupling loss. For example, the optical fiber is disposed through a ferrule that precisely locates the optical fiber with relation to the fiber optic connector housing.

Lenses having a gradient index (e.g., "GRIN" lens) may be provided to more easily facilitate multiple optical fiber connections between the optic connector of a cable assembly and other optical connectors or other optical devices. Such lenses may be used to focus light with a precisely controlled radial variation of the lens material's index of refraction from the optical axis to the edge of the lens. In some embodiments, the internal structure of this index gradient allows the lens, with flat surfaces, to collimate light emitted from an optical fiber or to focus an incident beam into an optical fiber. The lens can be provided in the form of a glass rod that is disposed in a lens holder as part of an optical connector. Flat surfaces of such a lens may allow easy bonding or fusing of one end to an optical fiber disposed inside the fiber optic connector with the other end of the lens disposed on the ferrule end face. The flat surface on the end face of a lens can displace liquids upon coupled with a mated optical connector, because the end faces can be polished to be planar to slightly inset with respect to a coupling surface of the optical connector.

In some embodiments, the flat surface of the lens allows for easy cleaning of end faces of the lens. The optical coupling face of the optical connector should be easily accessible to a user for cleaning purposes, and generally free from mechanical structure. Embodiments of the present disclosure provide for an optical coupling face that is substantially free from mechanical structures or features by use of retractable alignment pins and coded magnetic arrays. When the optical connector is not in use, the alignment pins may be positioned in a retracted state within internal bores of the optical connector such that they do not interfere with the ability of the user to wipe the optical coupling surface of the optical connector free of foreign substances. The alignment pins may then be translated into a protracted state such that they extend beyond the optical coupling face when the user would like to connect the optical connector of the cable assembly to a mated optical connector of an electronic device. The alignment pins may be inserted into corresponding bores of the mated optical connector to provide coarse alignment of the optical fibers of the optical connector with the optical components of the mated optical connector, such as optical fibers, flat lenses, laser diodes, or photodiodes. The coded magnetic array of the cable assembly is magnetically attracted to a coded magnetic array of the mated optical connector. The coded magnetic arrays pull the optical connector into the proper orientation for fine alignment between the optical fibers within the optical connector and the optical components of the mated optical connector.

In this regard, in one embodiment, an optical connector subassembly includes a connector body, an optical coupling assembly within the connector body, a first and second alignment pin, and a pin switch coupled to the first and second alignment pins. The connector body includes a front surface, a first pin bore and a second pin bore. The optical coupling assembly includes at least one coded magnetic array having a plurality of magnetic regions, and an optical coupling face. The optical coupling assembly is configured to receive at least one optical fiber disposed within the optical coupling assembly such that optical signals propagate into and out of the at least one optical fiber through the optical coupling face of the optical coupling assembly. The first alignment pin is disposed within the first pin bore and the second alignment pin is disposed within the second pin bore. Actuation of the pin switch translates the first alignment pin and the second alignment pin between a protracted state and a retracted state.

In another embodiment, a cable assembly includes a connector housing, a connector body within the connector housing, an optical coupling assembly within the connector body, a first alignment pin and a second alignment pin, a pin switch coupled to the first and second alignment pins, and an optical cable. The connector housing defines an opening and includes a top surface. The connector body has a front surface at the opening, a first pin bore and a second pin bore. The optical coupling assembly includes an optical coupling face that is positioned at the opening of the connector housing, and at least one coded magnetic array having a plurality of magnetic regions. The optical cable includes an outer jacket and at least one optical fiber within the outer jacket, wherein a portion of the at least one optical fiber is disposed within the optical coupling assembly such that optical signals propagate into and out of the at least one optical fiber through the optical coupling face of the optical coupling assembly. The first alignment pin is disposed within the first pin bore and the second alignment pin is disposed within the second pin bore. Actuation of the pin switch translates the first alignment pin and the second alignment pin between a protracted state and a retracted state.

In yet another embodiment, an optical connector subassembly includes a connector body, an optical coupling assembly, a first alignment pin, and a second alignment pin. The connector body has a first pin bore and a second pin bore, wherein the first alignment pin is disposed within the first pin bore and the second alignment pin is disposed within the second pin bore. The optical coupling assembly includes an optical coupling face and at least one coded magnetic array. The optical coupling assembly is configured to receive at least one optical fiber disposed within the optical coupling assembly. The at least one coded magnetic array includes a plurality of magnetic regions and is located behind the optical coupling face within the optical coupling assembly. The first alignment pin and the second alignment pin translate within the optical coupling assembly between a protracted state and a retracted state.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 3A is a front perspective view of another optical connector of another cable assembly with first and second alignment pins in a retracted state according to one or more embodiments described and illustrated herein;

FIG. 3B is a front perspective view of the optical connector depicted in FIG. 3A with first and second alignment pins in a protracted state;

FIG. 3I is a perspective view of a partially assembled optical connector of the optical connector depicted in FIG. 3A, wherein the first and second alignment pins are in a protracted state;

FIG. 3K is a partial cutaway, perspective view of the assembled optical connector of FIG. 3A;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments of the present disclosure are directed to optical connectors that may be a component of an optical cable assembly used to communicatively couple electronic devices by transmission of optical signals over optical fibers. The optical connectors have a substantially planar optical interface free from mechanical alignment features that may be easily wiped clean of debris by a user. More specifically, embodiments of the present disclosure utilize retractable alignment pins that translate between retracted and protracted states, as well as one or more magnetic components (e.g., coded magnetic arrays) to both align optical components of mated optical connectors and provide a robust mechanical connection between mated optical connectors. When in the retracted state, the optical interface and associated optical components may be unobstructed by the alignment pins and easily wiped clean. When in the protracted state, the alignment pins are inserted into corresponding pin bores of a mated optical connector to provide a coarse alignment of the optical components of both optical connectors. The alignment pins also provide for resistance to angular forces to maintain the mated relationship between the two optical connectors (e.g., accidental pulling of the optical cable). A coded magnetic array is provided in both optical connectors (e.g., one in the optical connector of the cable assembly and one in the optical connector of an electronic device) such that both coded magnetic arrays are magnetically coupled in only one orientation to provide fine alignment between optical components of both optical connectors. The magnetic force between the coupled coded magnetic arrays also provides optical connector retention as well.

Figure 1A:
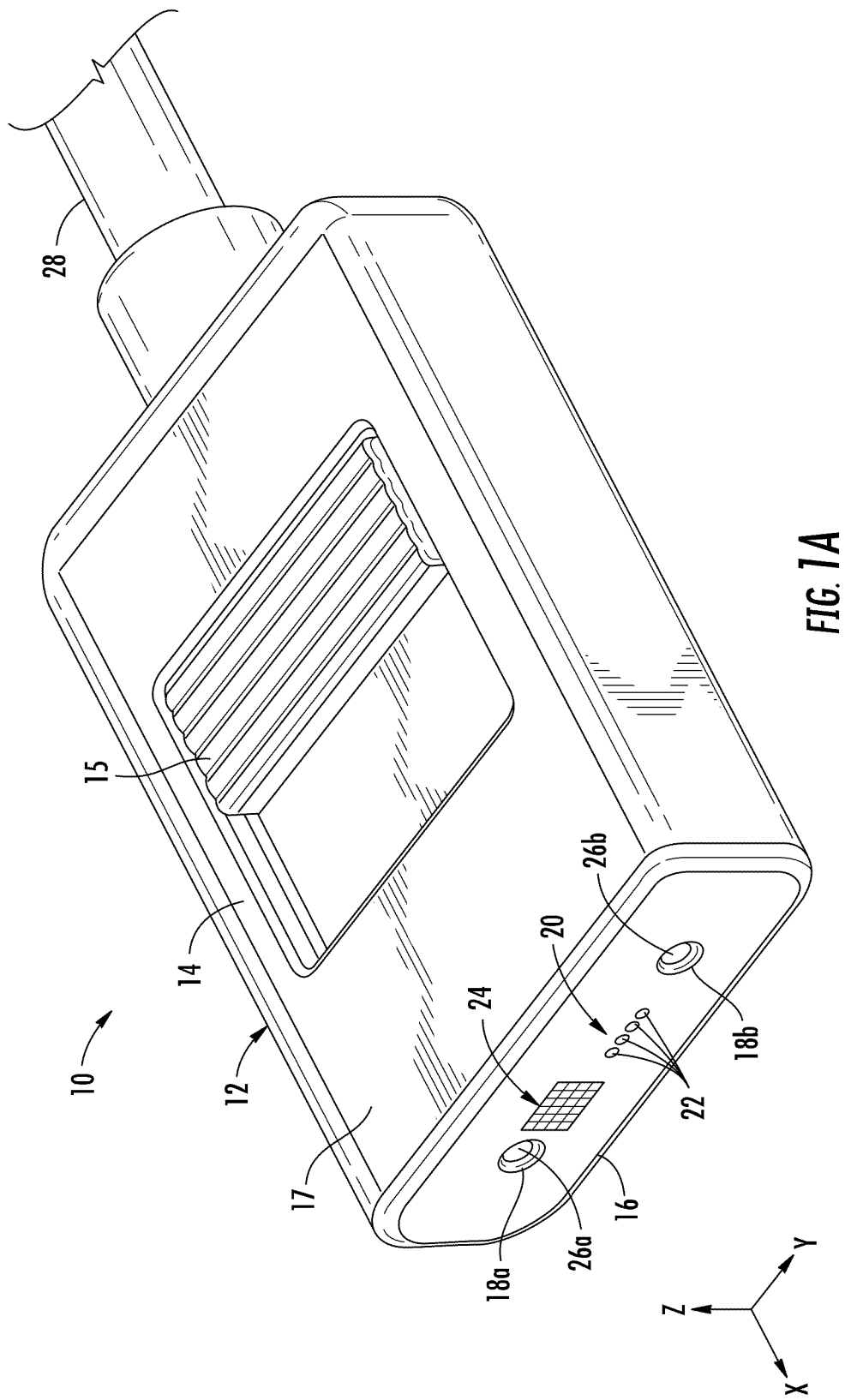
FIG. 1A is a front perspective view of an optical connector of a cable assembly with first and second alignment pins in a retracted state according to one or more embodiments described and illustrated herein.
Figure 1B:
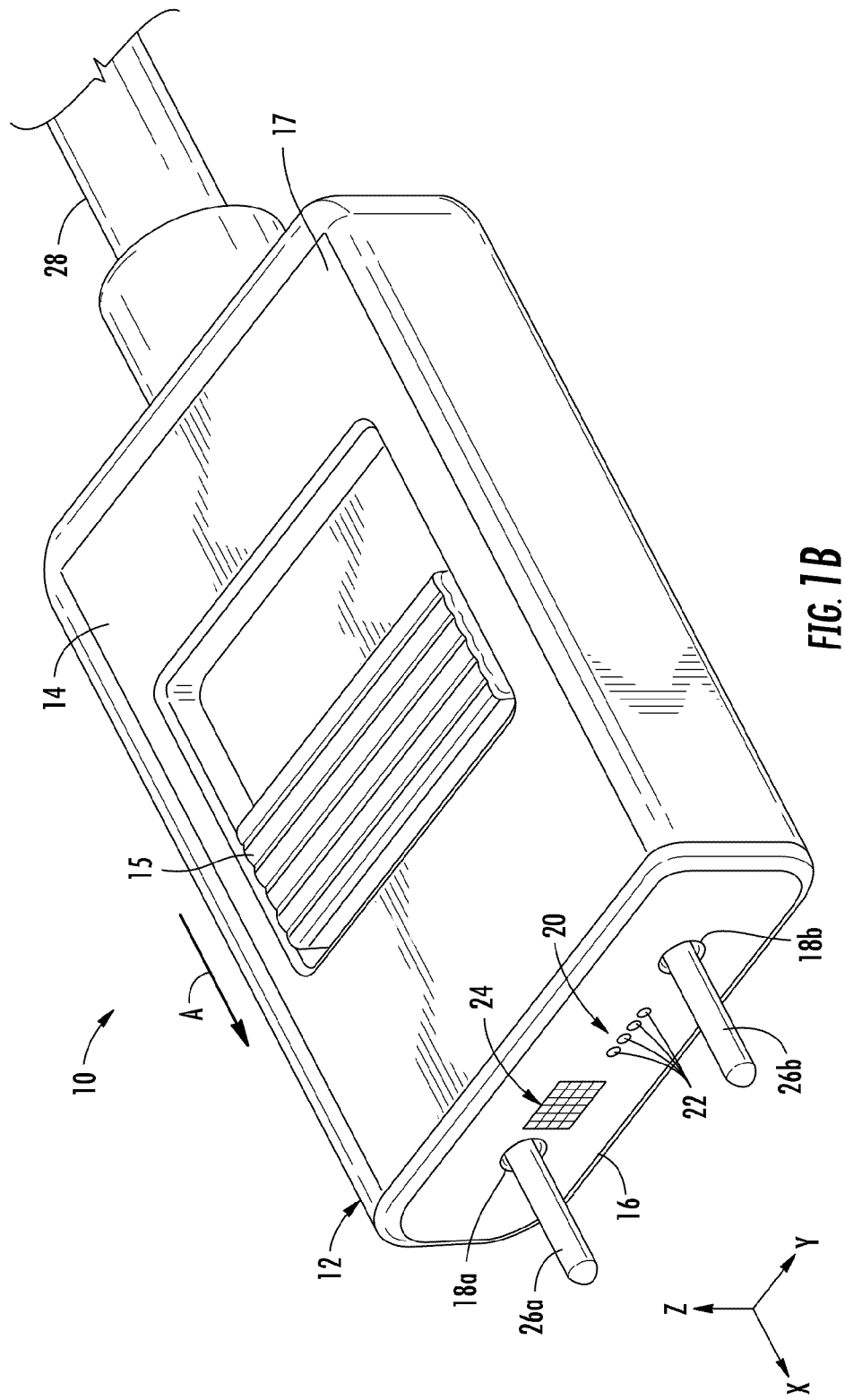
FIG. 1B is a front perspective view of the optical connector depicted in FIG. 1A with first and second alignment pins in a protracted state.

In this regard, FIGS. 1A and 1B are front perspective views of an exemplary cable assembly 10 having a first optical connector 12 comprising first and second alignment pins 26a, 26b in a retracted state and a protracted state, respectively. The cable assembly 10 may be used to communicatively couple electronic devices by optical signal transmission over optical fibers (not shown in FIGS. 1A and 1B) within an optical cable 28 of the cable assembly 10. As an example and not a limitation, the illustrated cable assembly may be used to communicatively couple a personal computer to a mobile electronic device, such as a smart phone or an external storage device. Data may be transferred between the personal computer and the mobile electronic device via optical signals. It should be understood that the cable assembly 10 may be utilized in many other high-speed data applications.

The first optical connector 12 of the illustrated embodiment generally comprises a connector housing 14 having an optical coupling face 16 of an optical coupling assembly that may be coupled to a mated optical connector, such as another cable assembly or an electronic device. In the illustrated embodiment, the optical coupling face 16 is integral with the connector housing. Within the connector housing 14 are first and second pin bores 18a, 18b that maintain the first and second alignment pins 26a, 26b, respectively. The optical coupling face 16 further comprises an optical coupling region 20 that allows optical signals to travel into and out of the optical coupling face 16. The optical coupling region 20 may include one or more optical components 22 into and out of which optical signals may propagate. The optical coupling face 16 further comprises a magnetic component configured as a coded magnetic array 24 for fine alignment of the optical components 22 to optical components of a mated optical connector, as described in detail below. As described in detail below, in some embodiments the coded magnetic array 24 and the optical components may be permitted to float within the connector housing 14 such that optical alignment is achieved even if the mechanical forces on the connector housing resulting from mechanically connecting first optical connector 12 to a mated connector cause the connector housing to flex or otherwise deform. In alternative embodiments, the magnetic component may be configured not as a coded magnetic array but as a conventional magnet. As used herein, a "magnetic array" means an arrangement of individual magnetic regions configured to operate together, such as to facilitate alignment of the connector, and the phrase "conventional magnet" means any magnetic component that is not a "magnetic array." The magnetic array is "coded" when the individual magnetic regions are arranged in a manner particularly configured to operate with a mating set of regions (e.g., permanent magnets, electro-magnets, iron elements). In embodiments such as that illustrated in FIG. 1 where the optical coupling face is integral with the connector housing, the magnetic components 22 may provide a retention force only, while the first and second alignment pins 26a, 26b may provide optical alignment of the optical coupling region 20, In one embodiment, the optical components 22 are defined by an end of optical fiber that are exposed at the optical coupling region 20 within bores through the connector housing 14. For example, the ends of optical fibers within the connector housing 14 may be substantially planar with respect to the optical coupling face 16 such that the fiber ends may be butt-coupled to optical components of a mated optical connector.

The optical components 22 may also be configured to include flat lenses having a gradient index that are disposed in bores within the connector housing 14. An end face of each lens may be exposed at the optical coupling face 16 of the first optical connector 12. The end faces of the lenses may be substantially planar with respect to the optical coupling face 16, particular in those applications where liquid displacement is desired. Accordingly, the end faces of the lenses may be butt-coupled to optical components of a mated optical connector. As used herein, butt-coupled means coupling without the use of collimating optics by contact, or near contact within 5 μm, between mated optical components, whether the optical components are fiber ends, waveguides, or lens components, such as GRIN lenses, refractive lenses, or covered refractive lenses. In applications where liquid displacement is not a concern, the lenses may be within 100 μm of the optical coupling face, for example. In embodiments that utilize covered refractive lenses, a transmissive lens cover may be provided to allow for cleaning as well as displacement liquids when mated with a second, mated optical connector.

For effective optical data transmission between the first optical connector 12, the optical components 22 should be properly aligned with optical components of a second, mated optical connector. As described in detail below, embodiments described herein utilize retractable alignment pins to coarsely align the optical components 22 of the first optical connector 12 with the optical components of the mated optical connector, while the coded magnetic array is used for fine alignment of the optical components 22 during mating.

The first and second alignment pins 26a, 26b are disposed within first and second pin bores 18a, 18b, respectively. FIG. 1A depicts the first and second alignment pins 26a, 26b in a fully retracted state wherein the first and second alignment pins 26a, 26b are fully positioned within first and second bin bores 18a, 18b. The retracted state of the first and second alignment pins 26a, 26b enables easy access to the substantially planar optical coupling face 16 for cleaning purposes, as the optical components 22 should be free from grime and other debris to permit the transmission of optical signals. A user desiring to wipe the planar optical coupling face 16 of the first optical connector 12 may position the first and second alignment pins 26a, 26b in the retracted state so that they do not interfere with the application of a cleaning medium, such as a cloth.

In some embodiments, electrical conductors (not shown in FIGS. 1A-1D) span the length of the optical cable 28 and are electrically coupled to the first and second alignment pins 26a, 26b to enable power transfer across the cable assembly 10. Each alignment pin 26a, 26b, may have one or more conductive paths to transmit electrical power and/or data.

The first and second alignment pins 26a, 26b may be transitioned from the retracted state depicted in FIG. 1A to the fully protracted state depicted in FIG. 1B by an alignment pin translation device. In the present example, the alignment pin translation device is configured as a pin switch 15 that is located on a first surface 17 of the connector housing 14. The pin switch 15 is coupled to the first and second alignment pins 26a, 26b such that translation of the pin switch 15 toward the optical coupling face 16, as indicated by arrow A, also causes the first and second alignment pins 26a, 26b to emerge from the first and second pin bores 18a, 18b and extend into the protracted state depicted in FIG. 1B. As described in detail below, the first and second alignment pins 26a, 26b may be inserted into corresponding pin bores of a mated optical connector (e.g., first and second corresponding pin bores 88a, 88b of a second optical connector 80 depicted in FIG. 1C). The first and second alignment pins 26a, 26b provide coarse alignment of the optical components 22, as well as mechanical structure that enables a rigid and robust connection between the first optical connector 12 and a second optical connector 80 that is resistant to angular forces that may be inadvertently applied to the first optical connector 12 and/or the optical cable 28 (e.g., forces generated by a user may inadvertently tugging on the cable assembly 10).

Some embodiments described herein utilize coded magnetic array(s) 24 to provide fine alignment between the optical components of two mated optical couplings. Use of many individual magnetic regions may allow for random alignment errors of a single magnet-to-magnet coupling relationship to cancel out. The coded magnetic array(s) 24 described herein may allow for optical components 22, 92 to self-align with respect to one another. Use of such coded magnetic arrays may provide for a planar, liquid displacing optical interface that is easily wiped clean. The optical interface is liquid displacing in a sense that any liquid that is present in at least the optical coupling region 20 is displaced upon connection between the first optical connector and the second optical connector 80.

Figure 1C:
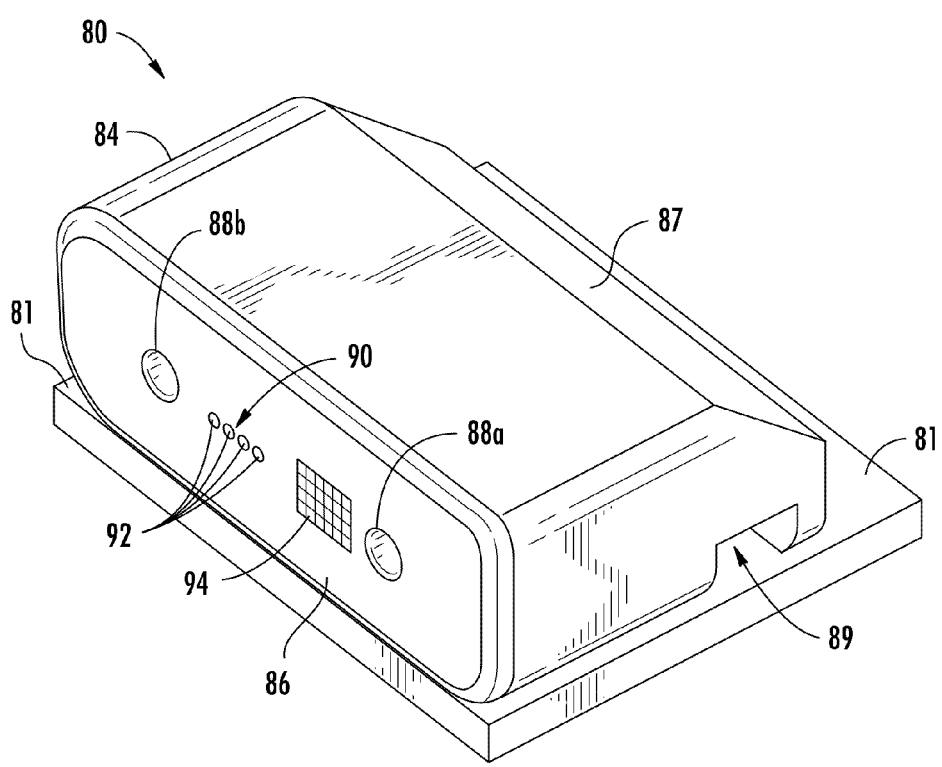
FIG. 1C is a front perspective view of a second optical connector configured to mate with the optical connector depicted in FIGS. 1A and 1B, according to one or more embodiments described and illustrated herein.

In the exemplary first optical connector 12 depicted in FIGS. 1A and 1B, a single coded magnetic array 24 is located adjacent to the optical coupling region 20. Although FIGS. 1A and 1C illustrate an optical connector 12 having a single coded magnetic array 24, more than one coded magnetic array may be provided (e.g., as in the exemplary optical connector 10' FIG. 10A illustrated in FIG. 2). Coded magnetic arrays of various configurations may be utilized. The illustrated coded magnetic array 24 comprises individual magnetic regions that may be formed from a bulk magnetic material that is magnetized to create the desired magnetic regions (e.g., magnetized in situ). An in situ magnetizing process is one in which bulk magnetic material is magnetized in precise zones (i.e., desired magnetic regions) in place within the device. For example, the optical coupling face 16 may be optically aligned to a device that imparts the magnetic properties to the bulk magnetic material.

Alternatively, the coded magnetic array may be configured as individual magnets that are embedded into the optical coupling face 16 of the first optical connector 12. In another embodiment, the magnetic regions may be configured as individual magnets that are provided in a molded magnet holder that is then inserted into an opening of the coupling face.

The coded magnetic array 24 is coded in the sense that the polarity of each magnetic region is in accordance with a magnetic coding pattern such that the coded magnetic array 24 is particularly configured to mate with a corresponding coded magnetic array having a magnetic coding pattern that is opposite from the magnetic coding pattern of the coded magnetic array 24 (e.g., may only mate therewith, is biased to only mate therewith). The polarity of the individual magnetic regions of the coded magnetic array 24 of the first optical connector 12 are magnetically attracted to the polarity of the individual magnetic regions of the coded magnetic array 94 of a mated, second optical connector 80 (see FIG. 1C, described below).

In the illustrated embodiment, the coded magnetic array 24 comprises magnetic regions that are arranged in a grid pattern. As an example and not a limitation, the magnetic coding pattern may be configured as a checkerboard pattern of alternating magnetic polarities. Other magnetic coding patterns may also be utilized. For example, the coded magnetic array may be asymmetric with respect to one or more axes of the connector, such as a vertical axis defined by the lengthwise center axes of the pins. The magnetic array may include magnetic regions of the array with different magnetic polarity from one another. The array may comprise at least three, such as at least ten, such as at least fifty individual magnetic regions. Use of a higher-fidelity magnetic array may improve the corresponding refinement of connector orientation provided by the magnetic array. In some embodiments, the magnetic regions of the array adjoin one another, such as being positioned within ten microns of one another. In other embodiments, the magnetic regions of the array are positioned further apart from one another. The array may include columns and rows of magnetic regions, such as at least two, five, or ten rows and/or columns. In some embodiments, the net magnetic field provided by the array is at least 0.7 millitesla (mT), such as at least 1.3 mT, at least 1.5 mT, or more, such that the magnetic field reorients the connector for refinement of the connection with a mating array or other structure. In contemplated embodiments, the net magnetic field provided by the array is at least 5 mT. However, in some such embodiments, the magnetic field is less than 20 mT, and may even be less than 0.7 mT but still a non-zero net value.

FIG. 1C illustrates an exemplary second optical connector 80 configured to be mated with the first optical connector 12 illustrated in FIGS. 1A and 1B. The second optical connector 80 may be configured as a connector within an electronic device having an optical coupling face 86 that is exposed in an opening of the housing of the electronic device, for example. The second optical connector 80 comprises a connector body 84 that may be coupled to a printed circuit board 81 (PCB) within the electronic device. It should be understood that embodiments are not limited to the second optical connector 80 depicted in FIG. 1C, as embodiments of the present disclosure may be coupled to mated optical connectors that are not provided within an electronic device, such as another cable assembly.

The mated, second optical connector 80 comprises an optical coupling region 90 defined by one or more optical components 92. The optical components 92 are positioned and configured to align with the optical components 22 of the first optical connector 12 when the two connectors are mated to enable optical data transmission therebetween. As described above, the optical components 92 may be configured as fiber ends, or as lens components, such as GRIN lenses and refractive lenses. In the case of refractive lenses, the refractive lenses may be located behind a transmissive cover to allow the optical interface to be liquid displacing.

The second optical connector 80 has first and second corresponding pin bores 88a, 88b, as well as a corresponding coded magnetic array 94. The first and second corresponding pin bores 88a, 88b are positioned and configured to receive the first and second alignment pins 26a, 26b of the first optical connector 12 of the cable assembly 10, respectively. Further, the corresponding coded magnetic array 94 is positioned and magnetically coded to attract the coded magnetic array 24 of the first optical connector 12 to align the optical components 22 of the cable assembly 10 with the optical components 92 of the second optical connector 80.

As an example and not a limitation, the connector body 84 may comprise a recess 89 that forms a gap between the connector body 84 and the PCB 81 such that an optical component, such as a light transmission device (e.g., a laser-emitting diode (LED), a vertical-cavity surface-emitting laser (VCSEL), and the like) and/or a light receiving device (e.g., a photodiode). In some embodiments, the component provides at least 50% transmittance at light 850 nm, 1300 nm, and/or 1410 nm wavelengths, such as at least 80% transmittance. In contemplated embodiments, the component may comprise a glass and/or a ceramic, such as zirconia. The connector body 84 may be formed of a material that is transmissive to the wavelength of the optical signals transmitted and received by the light transmission and receiving devices, and comprise an angled rear wall 87 such that optical signals propagating within the connector body 84 may be reflected by the angled rear wall 87 by total internal reflection. For example, optical signals propagating from the optical components 92 may be reflected by angled rear wall 87 and received by a light receiving device (not shown), while optical signals transmitted by a light transmission device (not shown) may be reflected by angled rear wall 87 and enter the optical components 92.

Figure 1D:
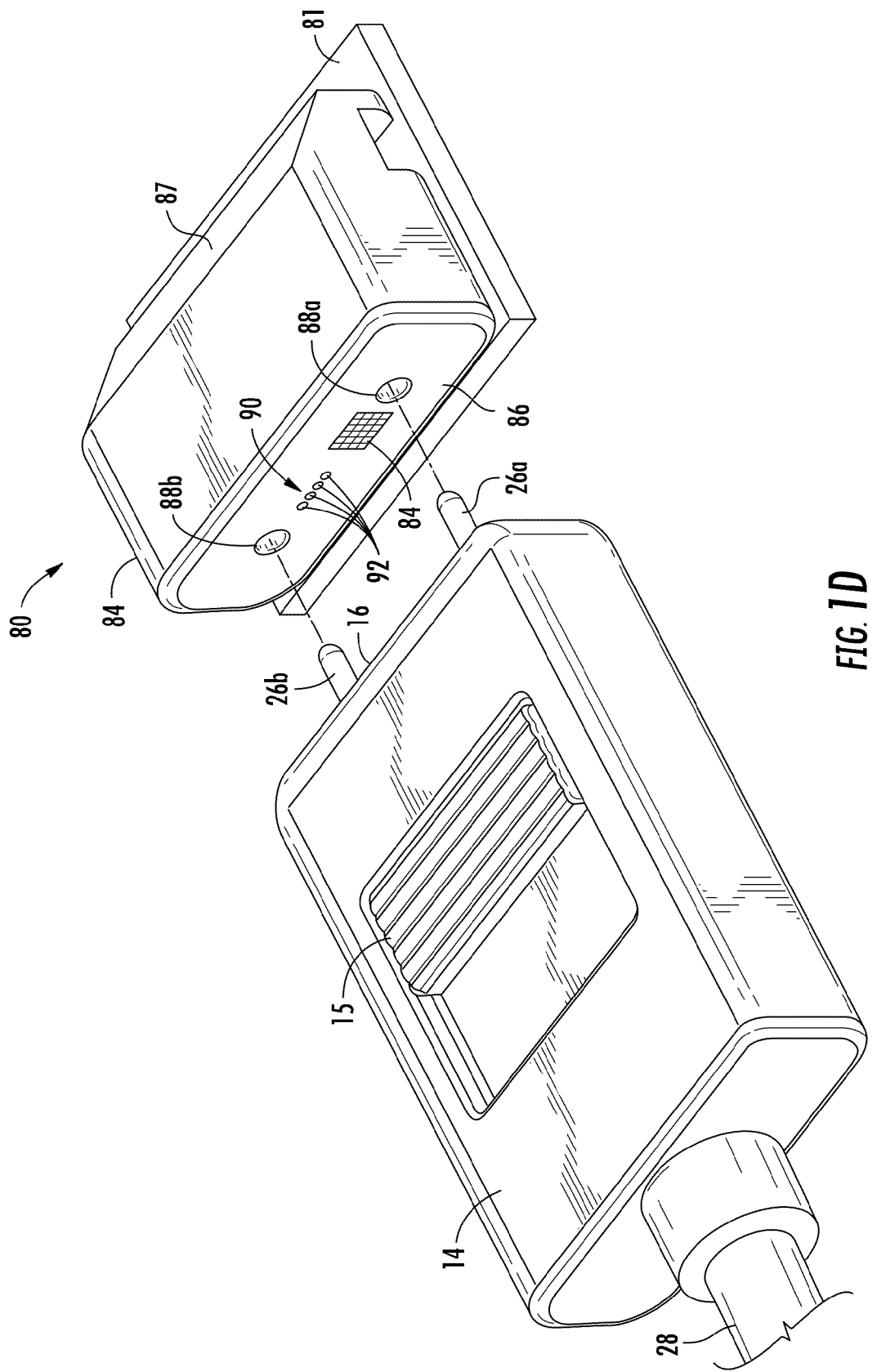
FIG. 1D is a front perspective view of the second optical connector depicted in FIG. 1C and a rear perspective view of the optical connector depicted in FIGS. 1A and 1B.

Referring now to FIG. 1D, the first optical connector 12 is illustrated as approaching the second optical connector 80 depicted in FIG. 1C, wherein the first and second alignment pins 26a, 26b of the first optical connector 12 are in a protracted state. The first and second alignment pins 26a, 26b are aligned for insertion into the corresponding pin bores 88a, 88b to coarsely align the optical components 22 of the first optical connector 12 with the optical components 92 of the second optical connector 80. In one embodiment, the diameter of the corresponding pin bores 88a, 88b is slightly larger than the diameter of the first and second alignment pins 26a, 26b, such that there is some freedom of movement of the first optical connector 12 with respect to the second optical connector, thereby providing coarse alignment of the coupled optical components 22, 92. While the pins and bores are shown to have round cross-sections, other shapes are contemplated, such as elliptical bores, rectilinear bores, etc. In some embodiments, the interior perimeter of the pin bores 88a, 88b is at least 2% greater than the corresponding exterior perimeter of the alignment pins 26a, 26b, such as at least 5% greater, whereby the bores 88a, 88b have sufficient tolerance for efficient manufacturing and allow for easy insertion of the alignment pins 26a, 26b. However, the extra space may allow for misalignment of the optical elements of the corresponding connector, such as lenses and/or optical channels provided by optical fibers. As such, the magnetic components may be used to compensate for the subtle misalignment of the pins 26a, 26b in the bores 88a, 88b.

The magnetic coupling of the coded magnetic array 24 of the first optical connector 12 and the coded magnetic array 94 of the second optical connector 80 provide for fine alignment of the coupled optical components. The many individual magnetic regions of the coded magnetic arrays 24, 94 cancel out random errors that may be present in any individual magnetic region, which allows the optical components 22, 92 to be precisely aligned with one another without the need for complicated alignment structures that may interfere with a user's ability to clean the optical coupling faces 16, 86 of the first and second optical connectors 12, 80. In other words, the coded magnetic arrays 24, 94 pull the optical coupling face 16 of the first optical connector 12 into the proper orientation with respect to the optical coupling face 86 of the second optical connector 80. The magnetic force between the coded magnetic arrays 24, 94 retain the first optical connector 12 and the second optical connector 80 in a mated relationship such that the optical components 22 of the first optical connector 12 are butt-coupled to, and aligned with, the optical components 92 of the second optical connector 80. As stated above and described in more detail below, the coded magnetic array 24 and the optical components 22 may be configured to float with respect to rest of the first optical connector 12, including the connector housing 14, to be precisely connected to the coded magnetic array 94 and optical components 92 of the second optical connector despite any deformation of the first and/or second optical connector 12, 80.

In some embodiments, the first and second corresponding pin bores 88a, 88b are electrically conductive, or contain electrically conductive components, and are configured to be electrically coupled to the first and second alignment pins 26a, 26b to provide for the transfer of electrical power between the first optical connector 12 and the second optical connector 80.

Figure 2A:
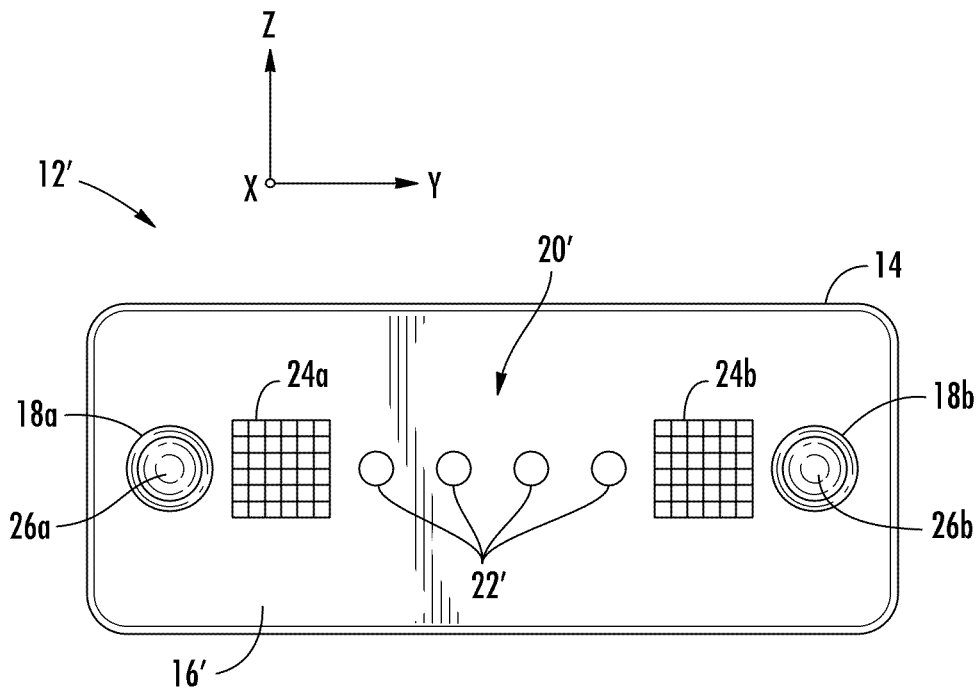
FIG. 2A is a front view of an alternative optical coupling face of an optical connector according to one or more embodiments described and illustrated herein.

Referring now to FIG. 2A, an optical coupling face 16' of an alternative first optical connector 12' is illustrated. The first optical connector 12' illustrated in FIG. 2A is similar to the first optical connector 12 depicted in FIGS. 1A-1D, except that the optical coupling face 16' includes a first coded magnetic array 24a and a second coded magnetic array 24b that are adjacent to a centrally located optical coupling region 20' comprising a plurality of optical components 22' (e.g., lenses or fiber ends). The first and second coded magnetic arrays 24a, 24b may have different magnetic coding patterns such that the first optical connector 12' may only be coupled to a mated optical connector in a single orientation. Other configurations are also possible. For example, one or more coded magnetic arrays may be positioned above and/or below the optical coupling region. In an alternative embodiment, the first and second coded magnetic arrays 24a, 24b may be configured as conventional magnets.

Figure 2B:
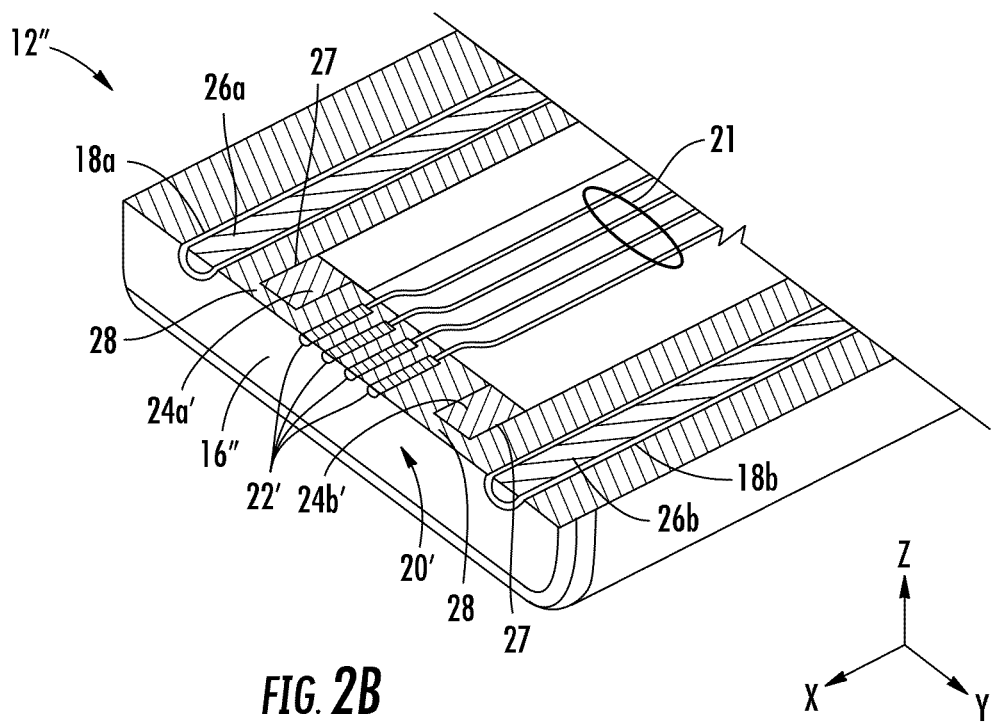
FIG. 2B is a perspective cross sectional view of an alternative optical connector with embedded magnetic components according to one or more embodiments described and illustrated herein.

FIG. 2B depicts an embodiment similar to the embodiment depicted in FIG. 2A, except that a first magnetic component 24a" and second magnetic component 24b" are located behind the optical coupling face 16" of the first optical connector 12". The first and second magnetic component 24a", 24b", which may be configured as conventional magnets or coded magnetic arrays, may be disposed in magnet recesses 27 within the first optical connector 12". Locating the first and second magnetic components 24a", 24b" behind the optical coupling face 16" may prevent direct corrosion of the magnetic components due to moisture ingress from the front side of the first optical connector 12", prevent pull out by providing an integrated structure within the first optical connector 12", and prevent magnetic component damage by providing a soft buffer layer between the magnetic component and any contaminates. The force provided by the first and second magnetic components 24a", 24b" should be high enough to provide the coupling functionality in the presence of a thin protective layer 28 provided by the optical coupling face 16". It should be understood that embodiments that have only one magnetic component may also be configured such that the single magnetic component is located behind the optical coupling face.

Figure 3C:
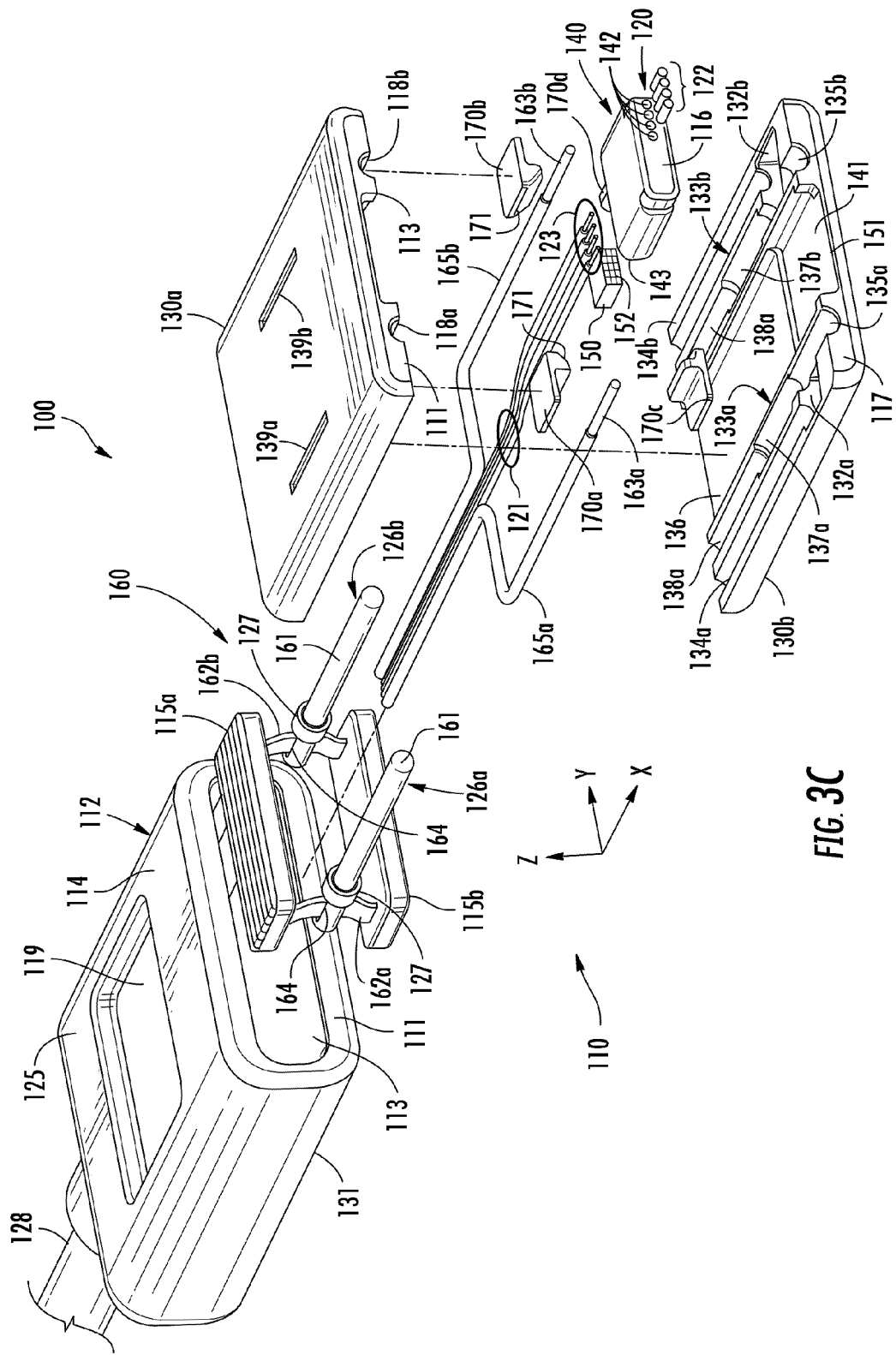
FIG. 3C is a partially exploded, perspective view of the optical connector depicted in FIG. 3A.

FIGS. 3A-3L illustrate an exemplary cable assembly 100 comprising a optical cable 128 coupled to an optical connector 112 having retractable first and second alignment pins 126a, 126b. FIG. 3A depicts the optical connector 112 with the first and second alignment pins 126a, 126 in a retracted state, while FIG. 3B depicts the first and second alignment pins 126a, 126b in a protracted state. The optical connector further comprises a connector housing 114 that encloses a connector body 130 and defines an opening 113 at a front surface 111. An optical coupling assembly 140 is disposed within the connector body 130 such that an optical coupling face 116 of the optical coupling assembly 140 is exposed at the opening 113 of the connector housing. A front surface 117 of the connector body 130 is also exposed at the opening 113. The optical coupling face 116 of the optical coupling assembly 140 includes an optical coupling region 120, as described above with respect to the optical coupling region 20 of the first optical connector 12 depicted in FIGS. 1A-1D. The optical coupling assembly 140 further includes a coded magnetic array 150 (not shown in FIGS. 3A and 3B) that is positioned within the optical coupling assembly 140 adjacent to the optical coupling region 120 and behind the optical coupling face 116. Accordingly, in this embodiment, the coded magnetic array 150 is not exposed at the opening 113 of the optical connector 112.

The connector housing 114 further comprises an opening 119 in a top surface 125 and an opening (not shown in FIGS. 3A and 3B) in a bottom surface 131 in which a pin switch 115a/115b is positioned and free to translate back and forth along the x-axis. The openings 119 of the connector housing 114 expose top and bottom surfaces of the connector body 130. In the illustrated embodiment, a pin switch 115a, 115b is located on both the top and bottom of the optical connector 112. Although FIGS. 3A-3L depict an optical connector 112 having two pin switches 115a, 115b, it should be understood that embodiments may have only a single pin switch. Translation of the pin switch 115a/115b toward the opening 113 of the connector housing 114 as indicated by arrow A causes the first and second alignment pins 126a, 126b to move forward along the x-axis in a positive direction to be positioned in the protracted state.

The internal components of the cable assembly 100 depicted in FIGS. 3A and 3B and their arrangement will now be described. Referring now to FIG. 3C, an exploded perspective view of the cable assembly 100 is depicted. Each of the components of the cable assembly 100 will be described in turn with reference to FIG. 3C and other figures as specified. The connector body 130 is configured as a two-piece component comprising an upper connector body 130a and a lower connector body 130b. The upper and lower connector bodies 130a, 130b are identical, and form internal grooves and recesses to retain internal components of the optical connector 112 when coupled together.

Figure 3D:
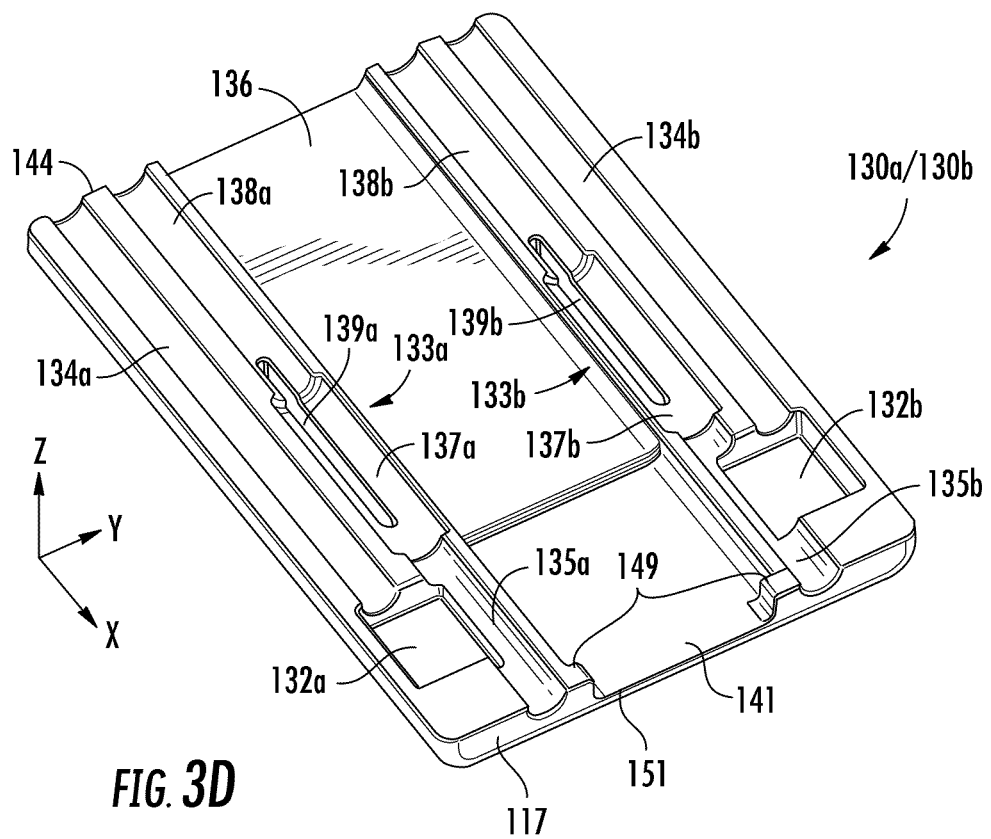
FIG. 3D is a perspective view of an upper or lower connector body of the optical connector depicted in FIG. 3A.

FIG. 3D illustrates a close-up perspective view of an upper/lower connector body 130a/130b. The upper/lower connector body 130a/130b comprises a first alignment pin groove 133a and a second alignment pin groove 133b. When the upper connector body 130a is coupled to the lower connector body 130b, the first and second alignment pin grooves 133a, 133b cooperate to form the first and second alignment pin bores 118a, 118b depicted in FIGS. 3A and 3B. The exemplary first and second alignment pin grooves 133a, 133b comprise a first section 135a, 135b, a second section 137a, 137b, and a third section 138a, 138b. The first and third sections 135a, 135b, 138a, 138b may have a diameter that is slightly larger than the diameter of the first and second alignment pins 126a, 126b such that the first and second alignment pins 126a, 126b are free to translate within the first and second bores 118a, 118b. The second section 137a, 137b may have a larger diameter than the first and third sections 135a, 135b, 138a, 138b to accept a larger circumferential portion 127 of the first and second alignment pins 126a, 126b.

The upper/lower connector body 130a/130b also includes an optical coupling assembly recess 141 that is shaped to surround a top or bottom half of the optical coupling assembly 140. The optical coupling assembly recess 141 defines an opening 151 through which the optical coupling face 116 is positioned (see FIGS. 3I and 3J). The optical coupling assembly 140 may be positioned within the optical coupling assembly recess 141 such that it has some freedom to float within the connector body 130 and connector housing 114. Providing some freedom of movement to the optical coupling assembly 140 allows the optical coupling assembly 140 to be pulled into precise alignment with a mated connector despite mechanical intolerances with respect to the remaining components of the optical connector 112 and/or a matted connector, as well as mechanical deformation resulting from mechanically coupling the optical connector 112 to the mated connector via the first and second alignment pins 126a, 126b.

Figure 3E:
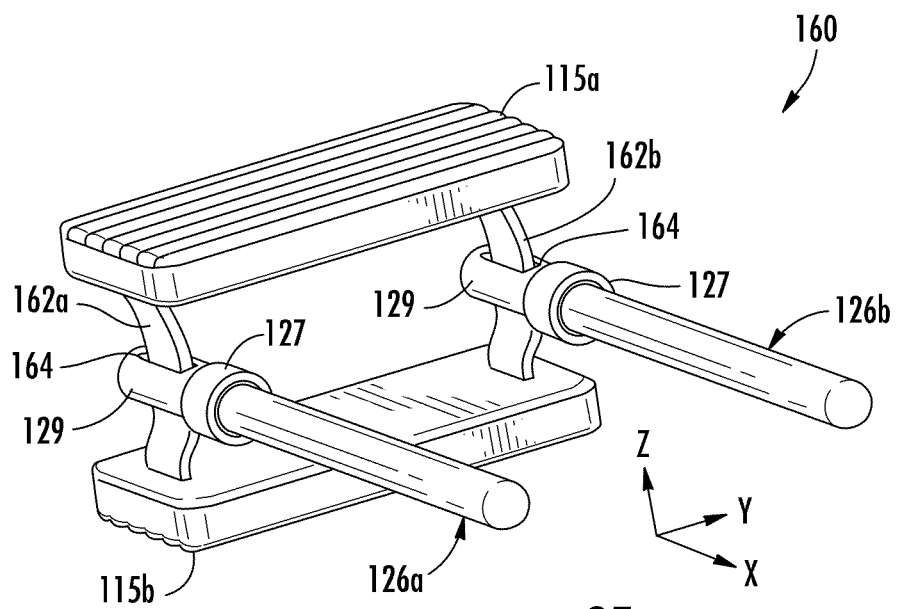
FIG. 3E is a perspective view of a translating pin assembly of the optical connector depicted in FIG. 3A.
Figure 3F:
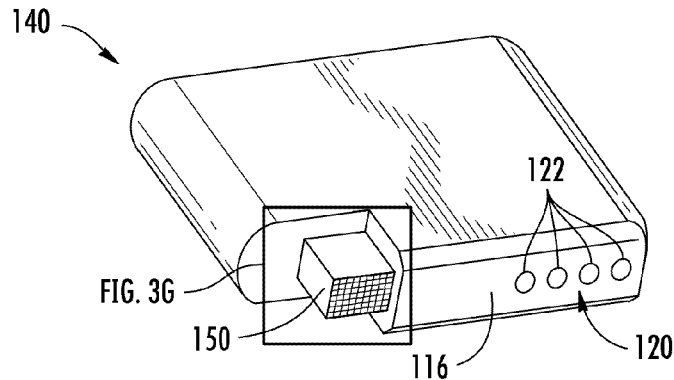
FIG. 3F is a partial cutaway, perspective view of an optical coupling assembly of the optical connector depicted in FIG. 3A.
Figure 3G:
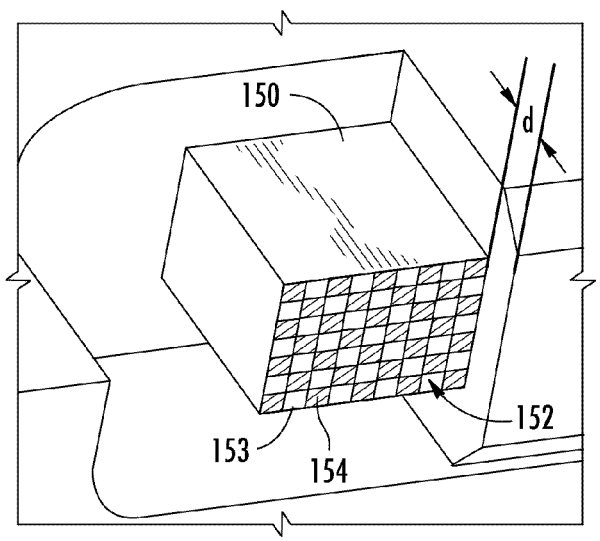
FIG. 3G is a close-up view of the cutaway portion of the optical coupling assembly depicted in FIG. 3F.
Figure 3H:
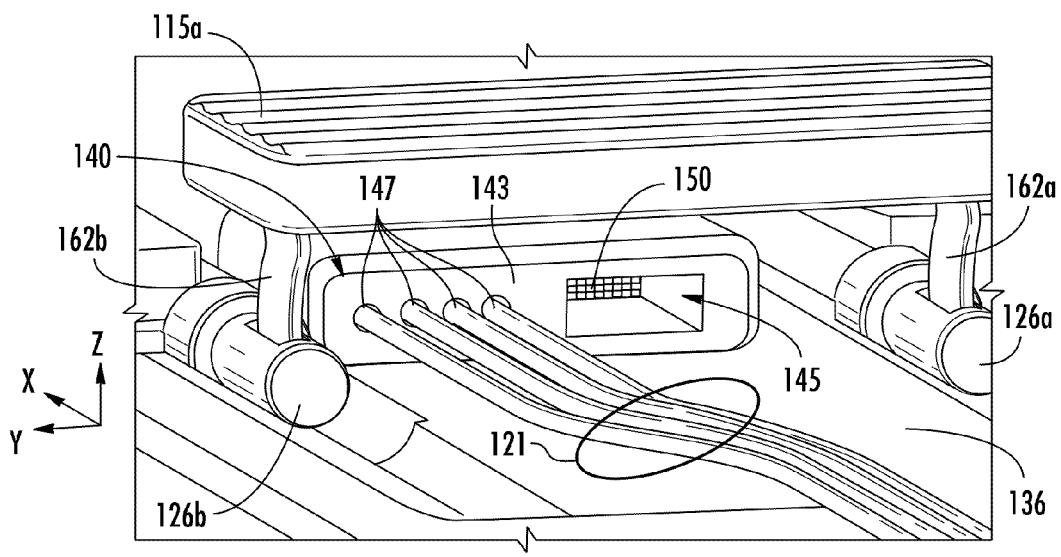
FIG. 3H is a perspective view from the rear of a partially assembled optical connector of the optical connector depicted in FIG. 3A showing internal components thereof.
Figure 3J:
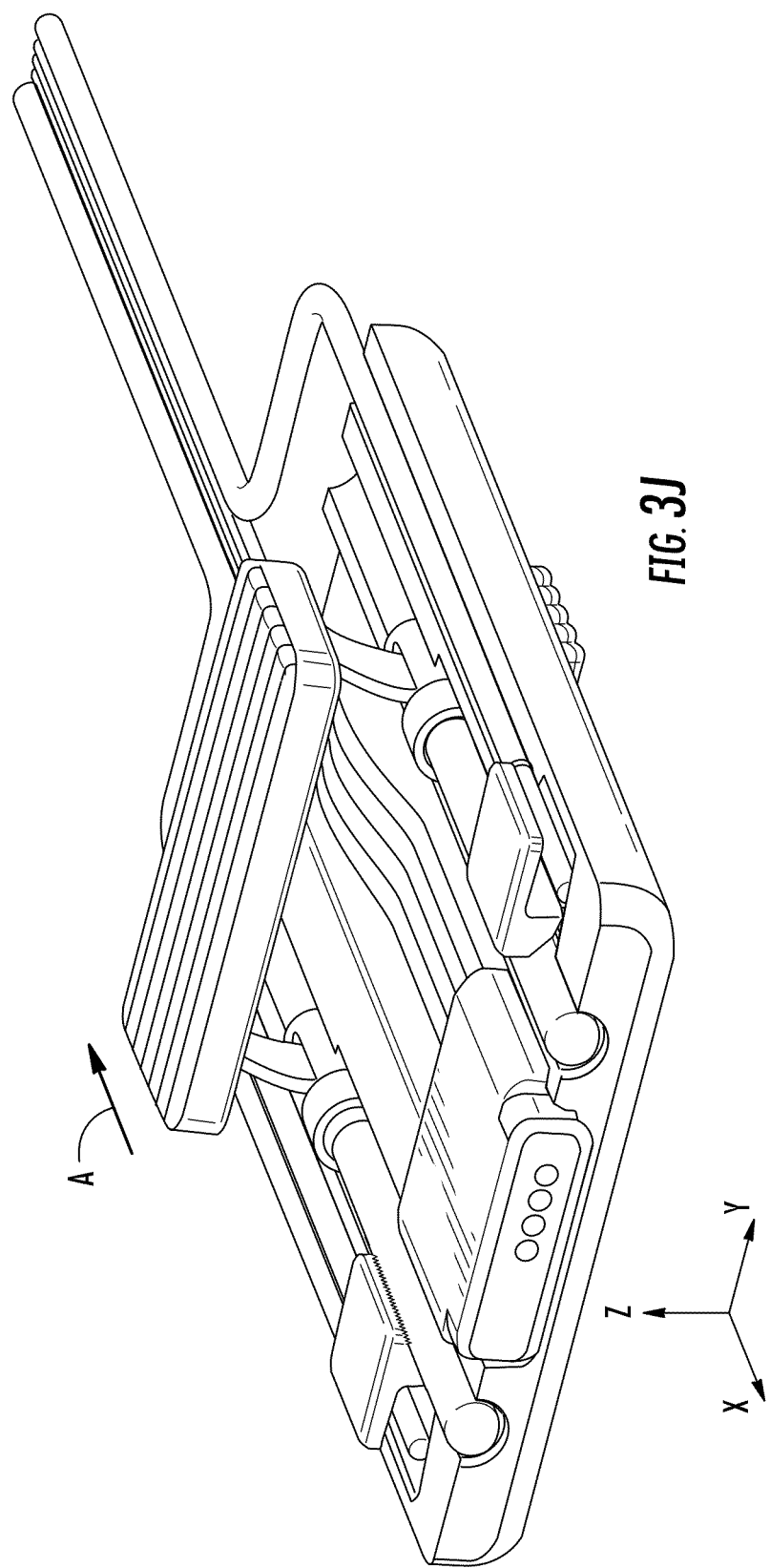
FIG. 3J is a perspective view of a partially assembled optical connector of the optical connector depicted in FIG. 3A, wherein the first and second alignment pins are in a retracted state.

First and second electrical conductor grooves 134a, 134b are provided within the upper/lower connector body 130a/130b such that, when the upper connector body 130a is coupled to the lower connector body 130b, the first and second electrical conductor grooves 134a, 134b form electrical conductor bores through which a first and second electrical conductor 165a, 156b (i.e., a conductive wire) may be positioned in embodiments that provide for the transfer of electrical power over the cable assembly 100 (see FIGS. 3I and 3J). The first electrical conductor 165a may provide a first voltage (e.g., a positive voltage) and the second electrical conductor 165b may provide a second voltage (e.g., ground). The first and second electrical conductor grooves 134a, 134b may not be provided in embodiments that do not transfer electrical power over the cable assembly 100.

The first and second electrical conductor grooves 134a, 134b extend from a rear edge 144 of the upper/lower connector body 130a/130b, and terminate at first and second electrical contact terminal recesses 132a, 132b, respectively. As described in more detail below with reference to FIGS. 3C, 3I and 3J, the first and second electrical contact terminal recesses 132a, 132b are configured to accept the electrical contact terminals 170a-170d that electrically couple the first and second electrical conductors 165a, 165b to the first and second alignment pins 126a, 126b.

Referring now to FIGS. 3C and 3E, the translating pin assembly 160 will be described in detail. The translating pin assembly 160 generally comprises the first and second alignment pins 126a, 126b, a first pin switch 115a, a second pin switch 115b, a first post 162a, and a second post 162b. The first and second alignment pins 126a, 126b may include a large circumferential portion 127 that separates a rear end 129 of the first and second alignment pins 126a, 126b from a coupling end 161 that mates with the corresponding pin bores of a mated optical connector. The first and second alignment pins 126a, 126b are inserted into the upper/lower connector body 130a/130b such that they are positioned in the second section 137a, 137b of the first and second alignment pin grooves 133a, 133b. The large circumferential portion 127 may act as a stop so that the first and second alignment pins 126a, 126b do not translate too far in the positive or negative direction along the x-axis.

The first and second posts 162a, 162b are coupled to a bottom surface of the first and second pin switches 115a, 115b to couple the first and second alignment pins 126a, 126b to the first and second pin switches 115a, 115b. The first and second posts 162a, 162b may be coupled to the first and second pin switches 115a, 115b by a snap fit, a suitable adhesive, or other fastening means. The rear end 129 of the first and second alignment pins 126a, 126b comprises a slot feature 164 through which the first or second post 162a, 162b is positioned. During assembly, a first end of the first and second posts 162a, 162b may be positioned through the first and second slots 139a, 139b of the lower connector body 130b, and then coupled to the second pin switch 115b. The first and second posts 162a, 162b may then be positioned through the slot features 164 of the first and second alignment pins 126a, 126b, and then through first and second slots 139a, 139b of the upper connector body 130a. The second end of the first and second posts 162a, 162b may be coupled to the first pin switch 115a. FIGS. 3I and 3J depict a partially assembled view of the optical connector 112 wherein the first and second posts 162a, 162b are positioned through the lower connector body 130b.

Figure 3L:
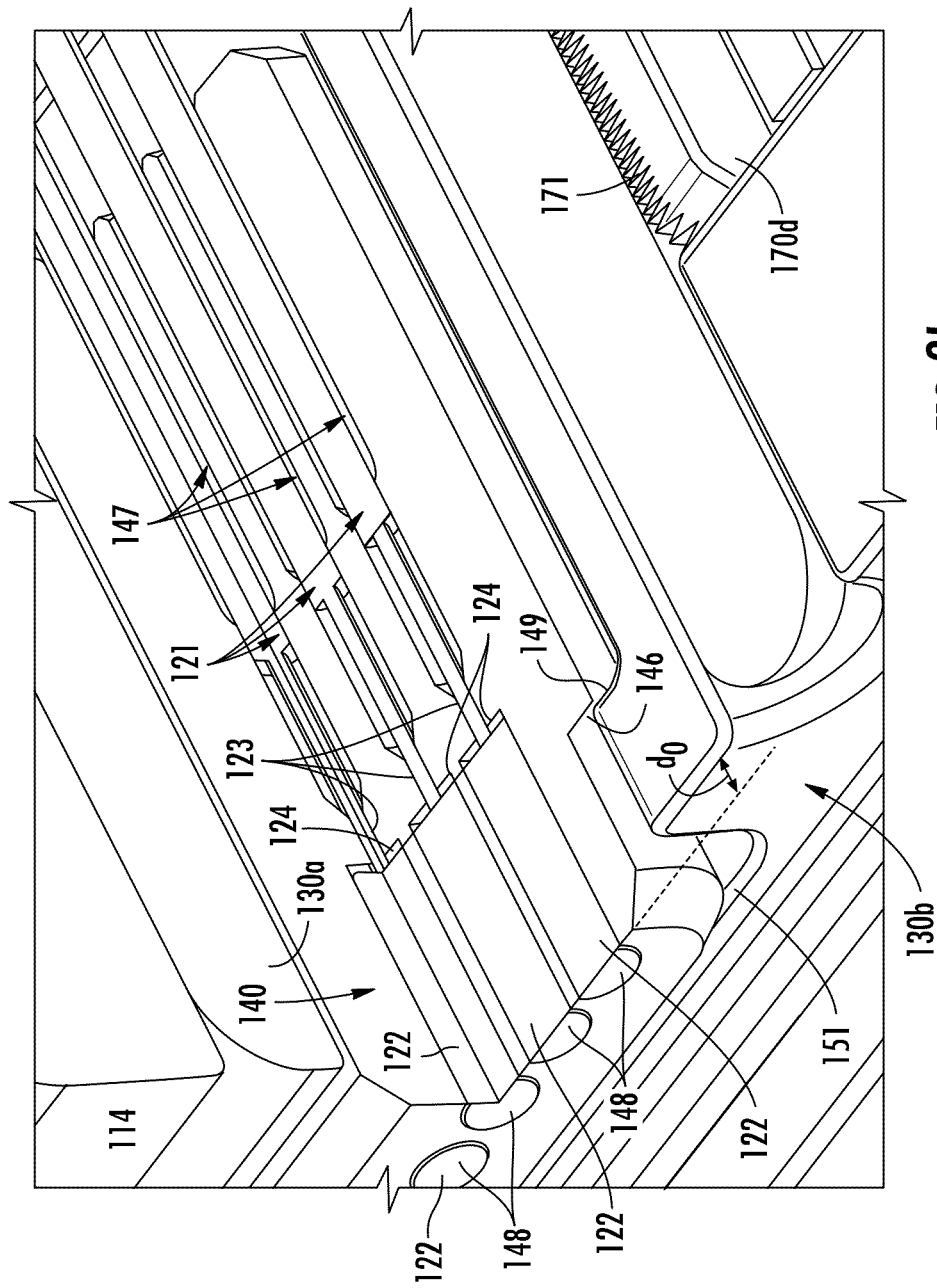
FIG. 3L is a close-up, cutaway view of the interface between optical fiber ends and lenses of the optical connector depicted in FIG. 3A.

The optical coupling assembly 140 comprises an optical coupling face 116 at which optical components 122, such as flat lenses having a gradient index, are exposed for coupling with optical components of a mated optical connector. In the illustrated embodiment, the optical coupling assembly comprises lens bores 142 (see FIG. 3C) into which lenses 122 are disposed. The lenses 122 have an end face 148 that is substantially planar (within 5 µm on average) with respect to the optical coupling face 116 (see FIG. 3L). FIG. 3H depicts a rear surface 143 of the exemplary optical coupling assembly 140, and several fiber bores 147 that are configured to receive the optical fibers 121. FIG. 3K depicts a cutaway view of an assembled optical connector 112, while FIG. 3L depicts a close-up of the cutaway region of FIG. 3K, wherein the fiber bores 147 are better illustrated. The fiber bores 147 may have a larger diameter closer to the rear surface 143 of the optical coupling assembly 140, and then have sections of reduced diameter to closely match the diameter of an exposed fiber cladding at the ends 123 of the optical fibers 121, wherein the optical fiber ends 123 are stripped of any outer jacket to the fiber cladding. Having fiber bores 147 with a larger diameter than the optical fibers 121 provides for easy insertion of the optical fibers 121 into the fiber bores 147.

The lenses 122 are disposed in the lens bores 142 and the optical fibers 121 are disposed in the fiber bores 147 such that the ends 123 of the optical fibers 121 contact (or nearly contact within 5 µm) a rear surface of the lenses 122 (i.e., by butt-coupling). The lenses 122 and optical fibers 121 may be secured in the optical coupling assembly 140 by a suitable adhesive, for example.

FIG. 3F is a partial cutaway view of the optical coupling assembly 140 that depicts an internal coded magnetic array 150, while FIG. 3G is a close-up view of the cutaway region G depicted in FIG. 3F. The coded magnetic array 150 is configured as a block of ferrous material that is programmed to have a plurality of magnetic regions of differing magnetic polarity. FIG. 3G illustrates a coded magnetic array face 152 having a plurality of individual magnetic regions. As described above, the individual magnetic regions may have a magnetic polarity according to a magnetic coding pattern. As an example and not a limitation, the coded magnetic array 150 may be programmed to have a checkerboard magnetic coding pattern. As shown in FIG. 3G, individual magnetic region 153 may have a magnetic polarity (e.g., a first magnetic polarity) that is opposite from individual magnetic region 154 (e.g., a second magnetic polarity).

In the illustrated example, the coded magnetic array face 152 is offset from the optical coupling face 116 by an offset distance d, as the coded magnetic array 150 is disposed within the optical coupling assembly 140. Positioning the coded magnetic array 150 behind the optical coupling face 116 may make it easier for a user to wipe the optical coupling face 116 free of debris. It should be understood that, in other embodiments, the coded magnetic array face 152 may be exposed at the optical coupling face 116. In some embodiments, the offset distance d is less than 3 millimeters (mm), such as about 2 mm or less, and/or the offset distance d is at least 10 micrometers (µm), such as about 50 µm or more.

Referring now to FIG. 3H, the exemplary optical coupling assembly 140 comprises a magnet recess 145 that is exposed at the rear surface 143 of the optical coupling assembly 140 for insertion of the coded magnetic array 150. During assembly, the coded magnetic array 150 may be positioned into the magnet recess 145 at the rear surface 143 such that the coded magnetic array face 152 contacts an interior surface of the optical coupling assembly 140 and is located at a known offset distance d from the optical coupling face 116. The coded magnetic array 150 may be secured within the magnet recess 145 by use of mechanical features and/or by the use of a suitable adhesive.

Referring once again to FIG. 3L, as well as to FIG. 3C, the optical coupling assembly 140 comprises an engagement feature 146 positioned on the left and right sides and offset from the optical coupling face 116. The engagement features 146 are configured to contact protrusions 149 proximate the opening 151 of the upper and lower connector bodies 130a, 130b. The locations of the engagement features 146 and the protrusions 149 may be such that the optical coupling face 116 is offset from the front surface 117 of the upper and lower connector bodies 130a, 130b by an offset distance $d_o$. In this manner, only the optical coupling face 116 contributes to the interface between the optical connector 112 and a mated optical connector. In some embodiments, the offset distance $d_o$ is less than 2 millimeters (mm), such as about 1.5 mm or less, and/or the offset distance $d_o$ is at least 5 micrometers (µm), such as about 25 µm or more. In some embodiments, the optical coupling assembly 140 may be spring loaded to have some freedom of movement, or retained in a recess that limited rearward travel to less than a particular distance, such 0.5 mm, for example.

FIGS. 3I and 3J depict a partially assembled optical connector subassembly 110 wherein the first and second alignment pins 126a, 126b are in a protracted and retracted state, respectively. As described above, the optical coupling assembly 140 is positioned within the optical coupling assembly recess 141 with the optical coupling face offset from the front surface of the upper and lower connector bodies 130a, 130b. Optical fibers 121 are positioned within an internal recess 136 that forms an enclosure when the upper connector body 130a is coupled to the lower connector body 130b and are coupled to the lenses 122 within the optical coupling assembly 140 as described above. The translating pin assembly 160 is depicted as having the first and second posts 162a, 162b positioned through the first and second slots 139a, 139b (not shown in FIGS. 3I and 3J) of the lower connector body 130b such that the translating pin assembly 160 is slidably coupled to the lower (and upper) connector body 130b as indicated by arrow A. It is noted that the upper connector body 130a is depicted as being removed in FIGS. 3I and 3J to better depict the internal components of the optical connector subassembly 110. When fully assembled, the first and second posts 162a, 162b are positioned through the first and second slots 139a, 139b of both the upper and lower connector body 130a, 130b. As shown in FIGS. 3A, 3B and 3K, the pin switches 115a, 115b are located within the connector housing openings 119 so that they may be translated to transition the first and second alignment pins 126a, 126b between the retracted and protracted states.

Electrical contact terminals 170a-170d are disposed within the first and second electrical contact terminal recesses 132a, 132b of the upper and lower connector body 130a, 130b. The electrical contact terminals 170a-170d should be made from an electrically conductive material. The first and second electrical conductors 165a, 165b are stripped to reveal an electrically conductive core 163. The electrically conductive core 163 of the first and second electrical conductors 165a, 165b is positioned within the first and second electrical contact terminal recesses 132a, 132b and then electrically coupled to electrical contact terminals 170c, 170d. For example, the conductive core 163 may be soldered to electrical contact terminals 170c, 170d (and/or electrical contact terminals 170a, 170b). The electrical contact terminals 170a-170d have a curved surface 172 that contacts the first and second alignment pins 126a, 126b, thereby electrically coupling the first and second alignment pins 126a, 126b to the first and second electrical conductors 165a, 165b. Further, in some embodiments, more than two electrical conductors 165a, 165b may be utilized, and the first and second alignment pins 126a, 126b may provide for multiple conductive paths. It should be understood that in embodiments wherein the first and second alignment pins 126a, 126b are electrically conductive and configured to pass power and data, the pin switch 115a/115b should be non-electrically conductive. Additionally, referring to FIG. 3L, the electrical contact terminals 170a-170d may further comprise a cleaning element 171 that assists in removing debris from the first and second alignment pins 126a, 126b as they translate back and forth within the optical connector 112. The cleaning element 171 should be electrically conductive to provide for an electrical connection between the first and second alignment pins 126a, 126b and the first and second electrical conductors 165a, 165b. According to an exemplary embodiment, the first and second alignment pins 126a, 126b are each configured to support at least 250 mA of electricity at 5 V, and may be designed to support up to about 100 W of power.

When fully assembled, the first and second alignment pins 126a, 126b of the optical connector 112 may be positioned in a retracted state as shown in FIG. 3A when not in use or when the user is desirous of cleaning the optical coupling face 116. The first and second alignment pins 126a, 126b do not interfere with the ability of the user to clean the optical coupling face 116. The first and second pin switches 115a, 115b are slid forward toward the opening 113 of the connector housing 114 to translate the first and second alignment pins 126a, 126b into the protracted state to connect the optical connector 112 to second, mated optical connector. The first and second alignment pins 126a, 126b provide coarse alignment of the lenses 122 to the optical components of a mated optical connector, while also providing resistance to angular forces that may be applied to the cable assembly 100 while it is connected to the mated optical connector. The coded magnetic array 150 is magnetically coupled to a second coded magnetic array of the mated optical connector to provide both fine alignment of the lenses 122 and additional retention between the optical connector 112 and the mated optical connector.

As non-limiting examples, the lenses disclosed herein may comprise a generally cylindrical glass member having a radially varying index of refraction, the glass member having a length such that the lens has a pitch of less than about 0.23. As used herein, the pitch length of the lens, Lo, is 2π/A; the fractional pitch, or, hereafter, pitch, is L/Lo=LA/2π, where L is the physical length of the lens. In various embodiments, the pitch is between about 0.08 and 0.23, such as, for example, lenses having pitches of 0.22, 0.21, 0.20, 0.19, 0.18, 0.17, 0.16, 0.15, 0.14, 0.13, 0.12, 0.11, 0.10, 0.09 and 0.08. Some embodiments relate to small diameter lenses, such as lenses having a diameter less than or equal to about one (1) mm, for example, 0.8 mm. In certain embodiments, lenses having a diameter less than about 1 mm are operative to produce a beam having a mode field diameter between about 350 μm and 450 μm when illuminated with a beam having a mode field diameter of about 10.4 μm.

Further, it is intended that terms "fiber optic cables" and/or "optical fibers" include all types of single mode and multimode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multimode optical fibers, the optical fibers may be tight-buffered, non-buffered but color-coated or bare fibers (including one or more polymeric coatings surrounding a glass core and cladding). The optical fibers may be single-core fibers or multi-core fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, in some embodiments, the alignment pins may not be retractable, but the connectors may still include magnetic components, such as a coded magnetic array; and in some embodiments, the alignment pins may be retractable and include features to support the retraction/advance thereof, as disclosed herein, without including magnetic components. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An optical connector assembly comprising:
a connector body comprising a first pin bore and a second pin bore;
an optical coupling assembly within the connector body, the optical coupling assembly comprising:
at least one magnetic component; and
an optical coupling face, wherein the optical coupling assembly is configured to receive at least one optical fiber disposed within the optical coupling assembly such that optical signals may propagate into and out of the at least one optical fiber through the optical coupling face of the optical coupling assembly;
a first alignment pin and a second alignment pin, wherein the first alignment pin is disposed within the first pin bore and the second alignment pin is disposed within the second pin bore; and
a pin switch coupled to the first alignment pin and the second alignment pin, wherein actuation of the pin switch translates the first alignment pin and the second alignment pin between a protracted state and a retracted state,
wherein the first and second alignment pins are configured to facilitate general alignment of the at least one optical fiber, and wherein the magnetic component augments the facilitation of general alignment by providing fine alignment.

2. The assembly of claim 1, wherein the at least one magnetic component comprises at least one magnetic array comprising a plurality of magnetic regions.

3. The assembly of claim 2, wherein the magnetic array is coded and the plurality of magnetic regions comprises at least three magnetic regions adjoining one another.

4. The assembly of claim 3, wherein the at least one of the three regions is arranged to have a different magnetic polarity than another of the at least three regions.

5. The assembly of claim 2, wherein the plurality of magnetic regions are arranged asymmetrically with respect to a plane defined by the lengthwise center axes of the first and second pins such that the at least one coded magnetic array is configured to bias the optical coupling assembly to a particular orientation when mated with another plurality of magnetic regions having the opposite magnetic polarities.

6. The assembly of claim 2, wherein the at least one magnetic array comprises at least two columns and at least two rows of separate magnetic regions.

7. The assembly of claim 2, wherein the at least one magnetic array is positioned within the optical coupling assembly behind the optical coupling face, and wherein the optical assembly is configured to move relative to the connector body, thereby further facilitating refined alignment of the optical coupling assembly at least partially independent of alignment provided by the pins.

8. The assembly of claim 7, wherein:
the optical coupling assembly comprises a magnet recess within a rear surface of the optical coupling assembly; and
the at least one coded magnetic array is disposed within the magnet recess.

9. The assembly of claim 2, wherein:
each individual magnetic region of the plurality of magnetic regions has a first magnetic polarity or a second magnetic polarity;
the at least one magnetic array is coded and comprises a magnetic coding pattern defined by a magnetic polarity of the individual magnetic regions; and
the pattern includes magnetic regions of both the first and second polarities.

10. The assembly of claim 1, wherein the at least one magnetic component is an array that comprises at least two separate magnetic regions arranged such that the at least two separate magnetic regions bias the optical coupling assembly to a particular orientation when mated with other magnetic regions having the opposite magnetic polarities.

11. The assembly of claim 1, wherein the at least one magnetic component comprises at least one conventional magnet, and wherein the at least one conventional magnet is positioned within the optical coupling assembly behind the optical coupling face.

12. The assembly of claim 1, wherein the optical coupling assembly comprises at least one fiber bore, and the at least one optical fiber is disposed within the at least one fiber bore, and wherein the at least one optical fiber is disposed within the at least one fiber bore such that an end of the at least one optical fiber is substantially planar with respect to the optical coupling face.

13. The assembly of claim 1, further comprising at least one lens component within the optical coupling assembly, wherein an end of the at least one lens component is exposed at the optical coupling face, and the at least one optical fiber is optically coupled to the at least one lens component, and wherein the at least one lens component comprises a gradient index.

14. The assembly of claim 1, further comprising:
a first electrical contact terminal and a second electrical contact terminal, wherein the first electrical contact terminal is slidably and electrically coupled to the first alignment pin, and the second electrical contact terminal is slidably and electrically coupled to the second alignment pin, wherein electrical contact is maintained between the first and second electrical contact terminals and the first and second alignment pins, respectively, as the first and second alignment pins translate; and
a first electrical conductor electrically coupled to the first electrical contact terminal and a second electrical conductor electrically coupled to the second electrical contact terminal, wherein the first electrical conductor is associated with a first voltage and the second electrical conductor is associated with a second voltage.

15. The assembly of claim 1, wherein the pin switch comprises a first post and a second post, wherein:
the pin switch is substantially orthogonal with respect to the optical coupling face of the optical coupling assembly;
the first post extends from the a first end of the pin switch, and the second post extends from a second end of the pin switch; and
the first post is coupled to the first alignment pin and the second post is coupled to the second alignment pin; and
wherein the first alignment pin and the second alignment pin each comprises a slot feature configured to accept the first and second posts, respectively.

16. The assembly of claim 1, further comprising:
a connector housing defining an opening, the connector body within the connector housing;
an optical cable comprising at least one optical fiber, wherein a portion of the at least one optical fiber is disposed within the optical coupling assembly.

17. An optical connector assembly comprising:
a connector body comprising a first pin bore and a second pin bore;
an optical coupling assembly within the connector body, the optical coupling assembly comprising an optical coupling face, wherein the optical coupling assembly is configured to receive at least one optical fiber disposed within the optical coupling assembly;
at least one magnetic array comprising a plurality of magnetic regions, wherein the at least one coded magnetic array is associated with the optical coupling face of the optical coupling assembly, wherein the at least one magnetic array is comprises a plurality of magnetic regions, and wherein the plurality of magnetic regions comprises at least three magnetic regions; and
a first alignment pin and a second alignment pin, wherein the first alignment pin is disposed within the first pin bore and the second alignment pin is disposed within the second pin bore, and wherein the magnetic array is coded and the plurality of magnetic regions are arranged with respect to a plane defined by the lengthwise center axes of the first and second pins such that the at least one magnetic array is configured to bias the optical coupling assembly to a particular orientation when mated with another plurality of magnetic regions having the opposite magnetic polarities.

18. The optical connector assembly of claim 17, wherein:
the optical coupling assembly comprises a magnet recess within a rear surface of the optical coupling assembly; and
the at least one coded magnetic array is disposed within the magnet recess.

19. The optical connector assembly of claim 17, wherein:
- each individual magnetic region of the plurality of magnetic regions has a first magnetic polarity or a second magnetic polarity; and
- the at least one coded magnetic array comprises a magnetic coding pattern defined by a magnetic polarity of the individual magnetic regions; and
- the pattern includes magnetic regions of both the first and second polarities.

20. The optical connector assembly of claim 17, further comprising at least one lens having a gradient index within the optical coupling assembly, wherein an end of the at least one lens is exposed at the optical coupling face, and the at least one optical fiber is optically coupled to the at least one lens.

* * * * *